United States Patent [19]

Rees

[11] Patent Number: 4,588,234
[45] Date of Patent: * May 13, 1986

[54] BEARING ASSEMBLY FOR SEAT SLIDE STRUCTURES

[75] Inventor: Richard W. A. Rees, West Bloomfield, Mich.

[73] Assignee: General Motors Corporation, Detroit, Mich.

[*] Notice: The portion of the term of this patent subsequent to Apr. 16, 2002 has been disclaimed.

[21] Appl. No.: 709,881

[22] Filed: Mar. 8, 1985

[51] Int. Cl.⁴ .................................... F16C 29/04
[52] U.S. Cl. ................................................ 308/3.8
[58] Field of Search ................ 308/3.8, 6 R, 3.6; 312/341 R, 350, 332

[56] References Cited

U.S. PATENT DOCUMENTS

| | | | |
|---|---|---|---|
| 2,970,015 | 1/1961 | Ragsdale | 308/6 R |
| 3,545,716 | 12/1970 | Colautti | 308/3.8 |
| 4,375,905 | 3/1983 | Drouillard | 308/6 R |
| 4,511,187 | 4/1985 | Rees | 308/3.8 |

FOREIGN PATENT DOCUMENTS 1457675 11/1966 France .
779532 7/1957 United Kingdom .

Primary Examiner—Lenard A. Footland
Attorney, Agent, or Firm—Herbert Furman

[57] ABSTRACT

A bearing assembly for seat slide structures includes, in one embodiment, a plastic cage which is preassembled with a flexible elongate member which can be bowed intermediate thereof to support the track members of a seat slide structure, with such track members being spaced by uncaged balls.

1 Claim, 7 Drawing Figures

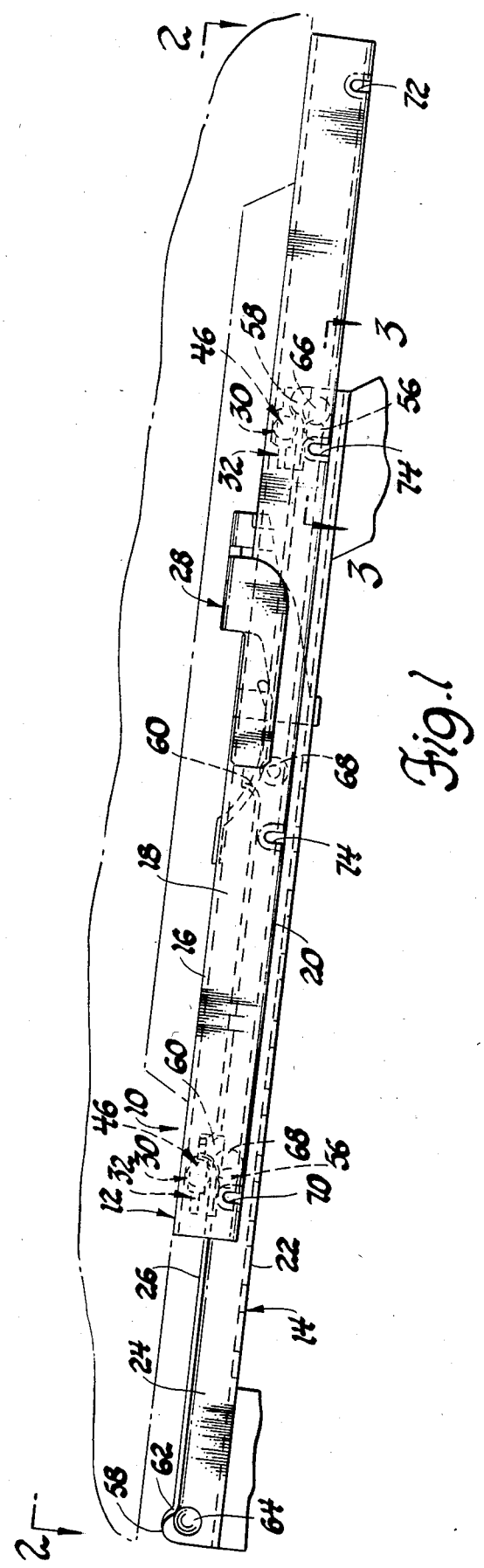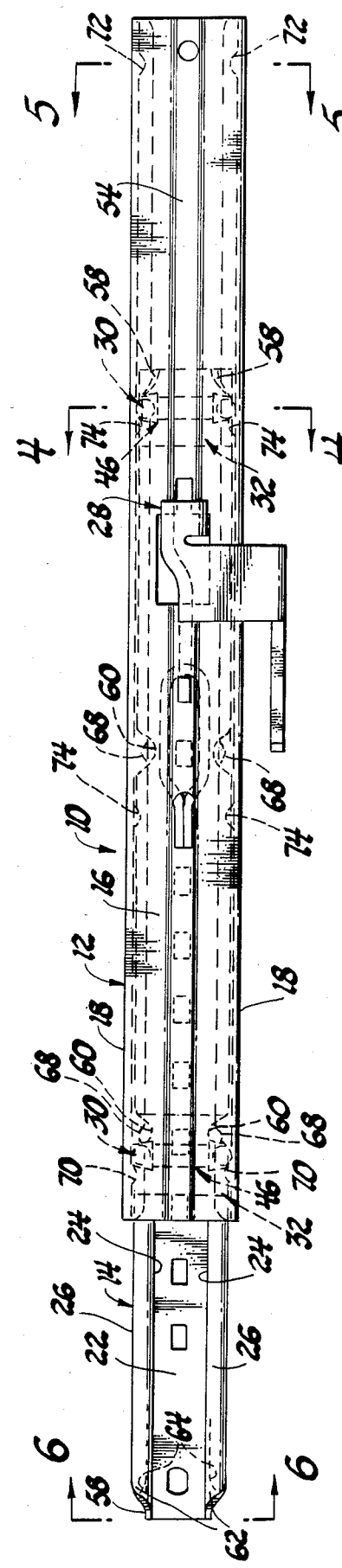

BEARING ASSEMBLY FOR SEAT SLIDE STRUCTURES

This invention relates generally to bearing assemblies for seat slide structures and more particularly to bearing assemblies of the type including a bowed flexible elongate member rotatably supporting one track member of the slide structure on the other track member.

The bearing assembly of this invention is an improvement over that shown in U.S. Pat. No. 4,511,187, Rees, issued Apr. 16, 1985, "Bearing Assembly for Seat Slide" and assigned to the assignee of this invention.

The Rees structure includes a flexible elongate member having a center axle portion and roller end portions which is located between the upper track member and the lower track member. The center axle portion of the elongate member is bowed by a longitudinal rib of the upper track member to engage the roller end portions with terminal flanges of the lower track member and the base wall of the upper track member. Balls are provided between the terminal flanges of the upper and lower track members to vertically locate the track members with respect to each other. The elongate member and the balls are located with respect to each other and the track members by a cage.

The bearing assembly of this invention includes bearing assembly front and rear units, each comprising a caged flexible elongate member and uncaged balls for adjustably supporting the upper track member on the lower track member. The cage is of plastic material and locates the elongate member transversely of the track members while the balls are permitted to move independently of the caged elongate member between the terminal flanges of the upper and lower track members. The movement of the elongate member of a unit is controlled by transversely aligned pairs of spaced integral arcuate stops in the terminal flanges of the lower track member. Each pair of stops is engaged by the roller end portions of the elongate member to limit the extent of linear movement of the caged member as the track members are adjusted. The extent of linear movement of the balls of the unit is controlled by engagement of the balls between integral stops in the side walls of the upper and lower track members. The engagement of the balls with the stops sets the extent of forward and rearward adjustment of the track members.

The primary feature of this invention is that it provides an improved bearing assembly for seat slide structures which comprises front and rear units, each including a caged flexible elongate member and uncaged balls, for adjustably supporting an upper track member on a lower track member. Another feature is that the elongate member and the balls of each unit are limited in their extent of linear movement by integral stops incorporated in the track members. A further feature is that the cage for the elongate member is of plastic material and the extent of movement of the member is controlled by engagement of the member with integral stops of the lower track member. Yet another feature is that the balls are controlled in their extent of linear movement by engagement between integral stops of the upper and lower track members.

These and other features will be readily apparent from the following specification and drawings wherein:

FIG. 1 is a side elevational view of a seat slide structure incorporating a bearing assembly according to this invention.

FIG. 2 is a top plan view of the seat slide structure.

Figure 3:
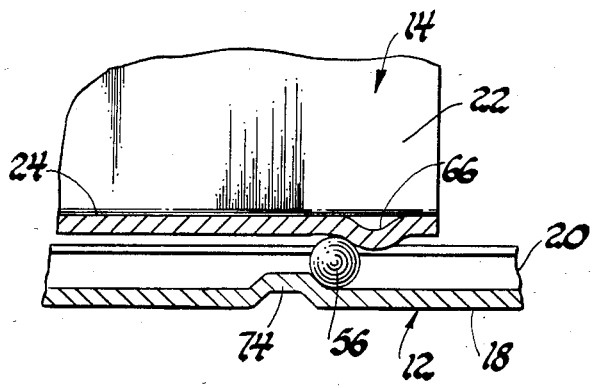
FIG. 3 is an enlarged sectional view taken along line 3—3 of FIG. 1.
Figure 4:
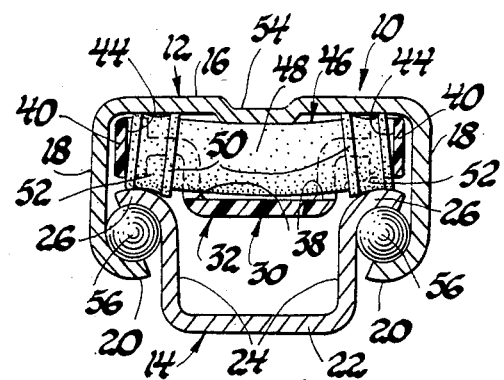
FIG. 4 is an enlarged sectional view taken along line 4—4 of FIG. 2.
Figure 6:
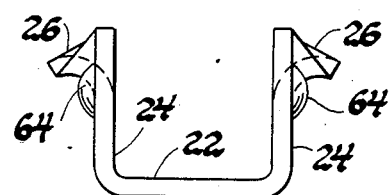
FIG. 6 is an enlarged view taken along line 6—6 of FIG. 2.
Figure 5:
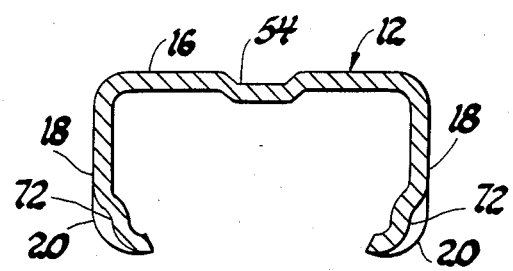
FIG. 5 is an enlarged sectional view taken along line 5—5 of FIG. 2.
Figure 7:
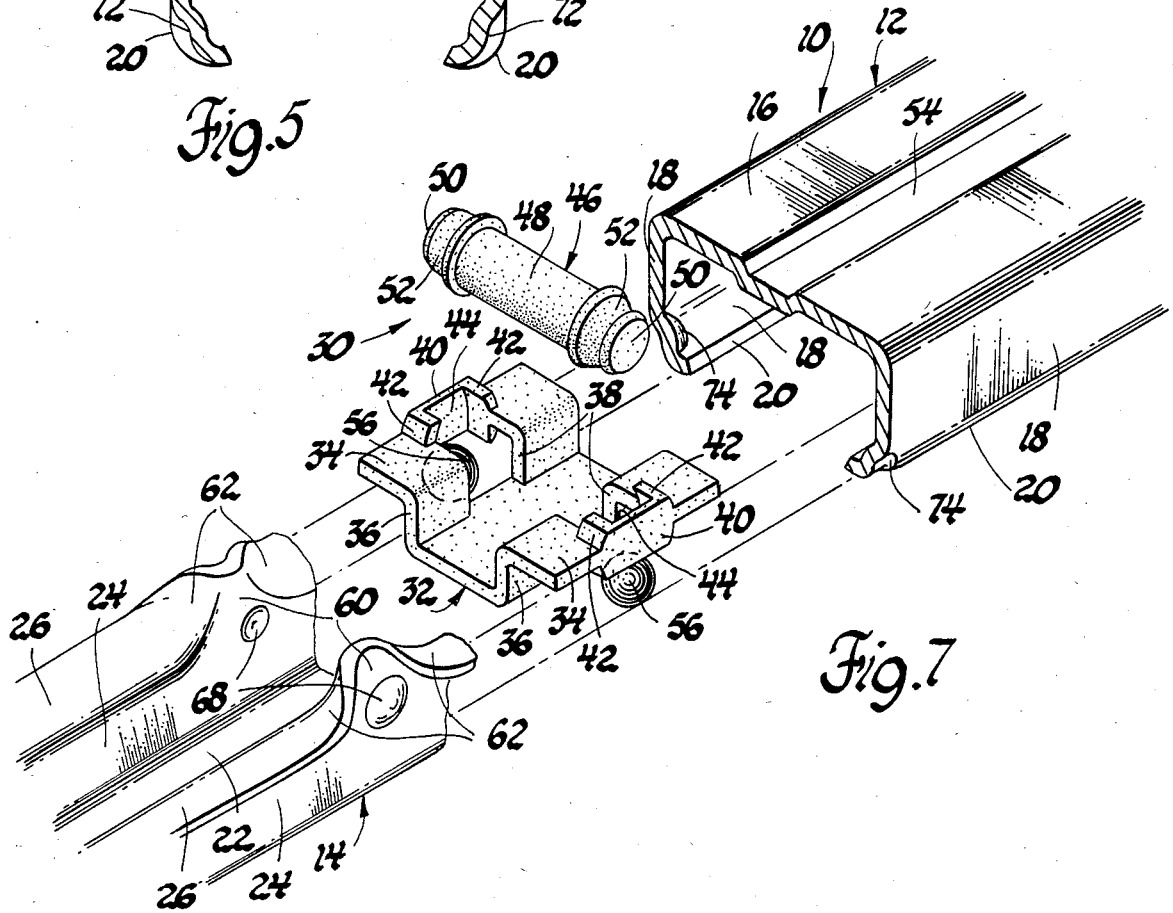
FIG. 7 is an exploded perspective view.

Referring now particularly to FIGS. 1 and 2 of the drawings, a seat slide structure 10 includes an upper track member 12 and a lower track member 14, both of which are of generally U-shape configuration. As best shown in FIGS. 4 and 7, the upper track member 12 includes a base wall 16, a pair of side walls 18 and a pair of arcuate terminal flanges 20. The lower track member 14 includes a base wall 22 which is juxtaposed to wall 16, a pair of side walls 24, each of which is juxtaposed to a respective side wall 18, and a pair of arcuate terminal flanges 26, each of which is juxtaposed to a respective flange 20.

The upper and lower track members are releasably latched in any one of a series of horizontally adjusted positions by a latch structure 28 which is disclosed and claimed in copending application Ser. No. 709,882, Rees, filed Mar. 8, 1985, and assigned to the assignee of this invention. While a particular latch structure is shown, it should be noted that the bearing assembly of this invention can be used with any other latch structures.

The upper track member 12 is adjustably supported on the lower track member 14 by front and rear bearing assembly units 30, each of which comprises a caged flexible elongate roller member and independently movable balls. Both units are structurally alike and the rear unit will now be described.

As best shown in FIG. 7, a generally U-shaped cage 32 of plastic material includes flanges 34 extending oppositely and laterally to the side walls 36 thereof. The side walls 36 and the flanges 34 are slotted at 38. The slots in the flanges 34 are closed by integral end walls 40 which are additionally joined to the flanges 34 by arcuate walls 42. Walls 40 and 42 and slots 38 define snap-in pockets 44.

A flexible elongate cylindrical bearing roller member 46 of plastic material includes a center axle portion 48 and tapered roller end portions 50, each of which is provided with a peripheral groove 52 of arcuate cross-section. The tapered end portions 50 snap into the pockets 44 of the cage 32 so that the bearing roller and the cage can be preassembled as a unit. The pockets are larger than the end portions but the upper and lower openings thereof are restricted so that the end portions 50 are loosely received within the pockets.

As shown in FIG. 4, the cage 32 and bearing roller 46 fit between the base wall 16 of the upper track member 12 and the flanges 26 of the lower track member 14. The engagement of an elongate rib 54 in the base wall 16 of the upper track member 12 bows the center axle portion 48 of the bearing roller 46 so that the tapered end portions 50 rotatably engage the inner surface of the base wall 16 and the grooves 52 rotatably engage the flanges 26 of the lower track member to thereby support the upper track member 12 on the lower track member 14. The track members are vertically spaced with respect to each other by uncaged balls 56 which are part of the bearing assembly unit and fit between and engage the pairs of flanges 20 and 26 under the vertical bias of the bowed bearing roller 46.

The extent of movement of the cage and bearing roller of each of the front and rear bearing assembly units 30 is controlled by transversely aligned pairs of spaced integral stops 58 and 60 of the lower track member 14. As shown in FIG. 7, the integral stops 60 are provided by embossing or forming portions of the flanges 26 of the lower track member 14 generally into alignment with the walls 24, with such stops including arcuate shoulders 62. The stops 58 are formed in the same manner as the stops 60 and have the same shoulders 62. As the track members move relative to each other the cage and bearing roller of each unit assembly is free to move independently of each track member. The extent of linear movement is controlled by engagement of the roller end portions 50 with the shoulders 62 of the stops 58 or the stops 60.

When the upper track member 12 is in its rearward position as shown in FIG. 1, the end portions 50 of the rollers 46 of the front and rear bearing assembly units normally engage the shoulders 62 of stops 60 and 58. When the upper track member 12 is in its full forward position, not shown, the end portions 50 of the rollers 46 of the front and rear units would engage the shoulders 62 of the stops 58 and 60 respectively.

The balls 56 of the front and rear bearing assembly units are uncaged and are free to move independently of each other and of the rollers 46 of such units between the flanges 20 and 26 of the upper and lower track members. In order to control the extent of linear movement of these balls and of the upper track member 12, the lower track member 14 is provided with outwardly embossed pairs of shoulders or abutments 64 and 66 adjacent the forward and rearward ends thereof and abutments 68 intermediate thereof. The upper track member 12 includes embossed pairs of shoulders or abutments 70 and 72 adjacent the forward and rearward ends thereof and like pairs of abutments 74 intermediate thereof.

As shown in FIG. 1, the extent of rearward movement of the upper track member 12 relative to the lower track member is limited by engagement of the balls 56 of the front bearing assembly unit with abutments 68 of the lower track member concurrently with engagement of the abutment 70 of the upper track member with such balls. Likewise, the balls 56 of the rear bearing assembly unit engage the abutments 66 of the lower track member concurrently with engagement of the abutments 74 of the upper track member with such balls.

The extent of forward movement of the upper track member relative to the lower track member would be limited by engagement of the balls 56 of the front bearing assembly unit with abutments 64 and concurrent engagement of the abutments 74 with such balls, and the engagement of the balls 56 of the rear unit with abutments 68 of the lower track member and the concurrent engagement of abutments 72 of the upper track member with such balls.

Thus this invention provides an improved bearing assembly for seat slide structures.

The embodiments of the invention in which an exclusive property or privilege is claimed are defined as follows.

I claim:

1. A seat slide comprising, a pair of generally U-shaped track members, one track member including a base wall, a pair of side walls and a terminal flange extending from each of the side walls, the other track member including a base wall opposed to the one base wall, a pair of side walls, each located in opposed spaced relationship to a respective side wall of the one track member, and a terminal flange extending from each of the side walls and located in opposed spaced paired relationship to a respective terminal flange of the one track member, bearing means located between the opposed paired terminal flanges, a flexible elongate cylindrical bearing roller located transversely of the track members between the base wall of the one track member and the terminal flanges of the other track member, said bearing roller including roller end portions rotatably engageable with the terminal flanges of the other track member and with the base wall of the one track member to bias the track members apart relative to each other and engage the bearing means with the opposed paired terminal flanges, each terminal flange of the other track member including a spaced pair of arcuate shoulders formed integrally therewith and defining the extent of rolling movement of the bearing roller relative to the other track member, each side wall of the other track member being provided with a spaced pair of shoulders formed integrally therewith and defining the extent of movement of the bearing mea

* * * * *

UNITED STATES PATENT AND TRADEMARK OFFICE
CERTIFICATE OF CORRECTION

PATENT NO. : 4,588,234

DATED : May 13, 1986

INVENTOR(S) : Richard W. A. Rees

It is certified that error appears in the above-identified patent and that said Letters Patent is hereby corrected as shown below:

Column 4, line 46  delete "mea"
          and insert -- means relative to the one track
                        member whereby both the bearing means
                        and the bearing rollers have predefined
                        extents of movement relative to the one
                        and the other track members. --

Signed and Sealed this

Ninth Day of September 1986

[SEAL]

Attest:

DONALD J. QUIGG

Attesting Officer

Commissioner of Patents and Trademarks